(12) United States Patent
Chien

(10) Patent No.: US 11,002,651 B2
(45) Date of Patent: May 11, 2021

(54) DEVICE, METHOD, AND SYSTEM FOR TESTING IMPACT RESISTANCE OF SHRINK FILM

(71) Applicants: HKC Corporation Limited, Shenzhen (CN); Chongqing HKC Optoelectronics Technology Co., Ltd., Chongqing (CN)

(72) Inventor: Chung-Kuang Chien, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 409 days.

(21) Appl. No.: 15/578,494

(22) PCT Filed: Aug. 15, 2017

(86) PCT No.: PCT/CN2017/097484
§ 371 (c)(1),
(2) Date: Nov. 30, 2017

(87) PCT Pub. No.: WO2018/133401
PCT Pub. Date: Jul. 26, 2018

(65) Prior Publication Data
US 2018/0313729 A1  Nov. 1, 2018

(30) Foreign Application Priority Data

Jan. 21, 2017 (CN) .......................... 201710045497.2

(51) Int. Cl.
*G01N 3/317* (2006.01)
*G01N 3/06* (2006.01)
(52) U.S. Cl.
CPC ............. *G01N 3/317* (2013.01); *G01N 3/062* (2013.01); *G01N 2203/005* (2013.01);
(Continued)

(58) Field of Classification Search
CPC .. G01N 3/317; G01N 3/062; G01N 2203/005; G01N 2203/0282; G01N 2203/0226; G01N 2203/0605
See application file for complete search history.

(56) References Cited

U.S. PATENT DOCUMENTS 3,266,289 A * 8/1966 Stamy .................... G01N 3/303
73/12.13
4,640,120 A * 2/1987 Garritano ............... G01N 3/303
73/12.13
(Continued)

FOREIGN PATENT DOCUMENTS

CN         204302122 U     4/2015
CN         104677740 A     6/2015
(Continued)

*Primary Examiner* — Herbert K Roberts
*Assistant Examiner* — John M Royston
(74) *Attorney, Agent, or Firm* — Muncy, Geissler, Olds & Lowe, P.C.

(57) ABSTRACT

A device for testing impact resistance includes: a shrink film supporting member, disposed on a horizontal platform, and including a main body, a supporting part, and fixing parts disposed on a sidewall of the main body, the supporting part is configured to support a tested shrink film, the plurality of fixing parts is sequentially disposed in parallel at positions of different heights on the sidewall of the main body, and the fixing parts disposed at the positions of different heights represent different impact resistance levels; a level plate, detachably fixed inside the main body by means of any one of the plurality of fixing parts; and an impact member, configured to move downward from a position above a geometric center of the supporting part at a preset speed to exert a frontal impact on the shrink film supported on the supporting part.

19 Claims, 1 Drawing Sheet

(52) U.S. Cl.
CPC ........... *G01N 2203/0226* (2013.01); *G01N 2203/0282* (2013.01); *G01N 2203/0605* (2013.01)

(56) References Cited

U.S. PATENT DOCUMENTS

| | | | |
|---|---|---|---|
| 2009/0282929 A1* | 11/2009 | Abu-Farha | G01N 3/04 73/856 |
| 2014/0150525 A1 | 6/2014 | Okawa et al. | |
| 2018/0238853 A1* | 8/2018 | Effler, Jr. | G01N 25/72 |

FOREIGN PATENT DOCUMENTS

| | | |
|---|---|---|
| CN | 105136590 A | 12/2015 |
| CN | 105259055 A | 1/2016 |
| CN | 206161452 U | 5/2017 |

* cited by examiner

DEVICE, METHOD, AND SYSTEM FOR TESTING IMPACT RESISTANCE OF SHRINK FILM

BACKGROUND

Technical Field

Embodiments of this application relate to the field of impact resistance measurement technologies, and in particular, to a device, a method, and a system for testing impact resistance of a shrink film.

Related Art

Because of its relatively high puncture resistance, favorable shrinkability, and specific shrinkage stress, a shrink film is widely applied to selling and transportation processes of various products and is used for stabilizing, covering, and protecting products. A shrink package made from a shrink film not only has a beautiful appearance, but also has damp-proof, dustproof, and anti-loose functions.

However, in the related art, there is no simple and convenient method for measuring impact resistance of a shrink film, and it is very inconvenient.

SUMMARY

Embodiments of this application provide a device, a method, and a system for testing impact resistance of a shrink film, so as to effectively and rapidly measure impact resistance of a shrink film. The device, the method, and the system are convenient to operate, easy to implement, low in costs, and suitable for wide application.

An aspect of this application provides a device for testing impact resistance of a shrink film, comprising:
a shrink film supporting member, disposed on a horizontal platform, where the shrink film supporting member comprises a hollow columnar main body, a supporting part formed by extending outward along an edge of a top end of the main body, and a plurality of fixing parts disposed on a sidewall of the main body, the supporting part is configured to support a tested shrink film, the plurality of fixing parts is sequentially disposed in parallel at positions of different heights on the sidewall of the main body, and the fixing parts disposed at the positions of different heights represent different impact resistance levels;
a level plate, detachably fixed inside the main body by means of any one of the plurality of fixing parts; and
an impact member, configured to move downward from a position above a geometric center of the supporting part at a preset speed to exert a frontal impact on the shrink film supported on the supporting part,
wherein the shrink film is not broken when the impact member gets in contact with the level plate, an impact resistance level of the shrink film is greater than or equal to an impact resistance level corresponding to a fixing part configured to fix the level plate is determined; otherwise, the impact resistance level of the shrink film is less than the impact resistance level corresponding to the fixing part configured to fix the level plate is determined.

In some implementations, distances between adjacent fixing parts among the plurality of fixing parts are equal.

In some implementations, the fixing part is a latch or a shelf disposed on an inner sidewall of the main body.

In some implementations, the impact member is rod-shaped, an upper end thereof is a columnar body sized and shaped for convenient grasping by a human hand, and a lower end thereof is a columnar protrusion extending along an end of the columnar body.

In some implementations, all of the shrink film supporting member, the level plate, and the impact member are made from a metal material or a tempered glass material.

In some implementations, the main body is a hollow columnar body, and the supporting part is an annular body.

Another aspect of this application further provides a system for testing impact resistance of a shrink film, comprising:
the foregoing device for testing impact resistance; and
a mechanical driving component, connected and fixed to the impact member, and configured to drive the impact member to move at a preset speed.

In some implementations, the mechanical driving component comprises:
a mechanical arm, configured to connect to and fix the impact member; and
a servo motor, mechanically connected to the mechanical arm, and configured to drive the mechanical arm to move.

In some implementations, the system for testing impact resistance further comprises a heating device, configured to heat the shrink film supported on the supporting part to make the shrink film shrink at a preset thermal shrinkage speed.

In some implementations, distances between adjacent fixing parts among the plurality of fixing parts are equal.

In some implementations, the fixing part is a latch or a shelf disposed on an inner sidewall of the main body.

In some implementations, the impact member is rod-shaped, an upper end thereof is a columnar body sized and shaped for convenient grasping by a human hand, and a lower end thereof is a columnar protrusion extending along an end of the columnar body.

In some implementations, all of the shrink film supporting member, the level plate, and the impact member are made from a metal material.

In some implementations, all of the shrink film supporting member, the level plate, and the impact member are made from a tempered glass material.

In some implementations, the main body is a hollow columnar body.

In some implementations, the supporting part is an annular body.

Another aspect of this application further provides a method for testing impact resistance of a shrink film, implemented based on the foregoing device for testing impact resistance of a shrink film or the foregoing system for testing impact resistance of a shrink film, where the method for testing impact resistance comprises:
covering a supporting part of a shrink film supporting member with a tested shrink film, and fixing an edge of the shrink film to the bottom of the shrink film supporting member;
heating the shrink film to make the shrink film shrink at a preset thermal shrinkage speed;
controlling an impact member to move downward from a position above a geometric center of the supporting part at a preset speed to exert a frontal impact on the shrink film supported on the supporting part;
when the impact member gets in contact with a level plate, observing whether the shrink film is broken; and
if the shrink film is not broken, an impact resistance level of the shrink film is greater than or equal to an impact resistance level corresponding to a fixing part configured to fix the level plate is determined; if the shrink film is broken, the impact resistance level of the shrink film is less than the impact resistance level corresponding to the fixing part configured to fix the level plate is determined.

This application provides a device for testing impact resistance of a shrink film including only a shrink film supporting member, a level plate, and an impact member, so as to rapidly and effectively measure impact resistance of a shrink film. The device is convenient to operate, easy to implementation, low in costs, and suitable for wide application.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description are some embodiments of this application, and a person of ordinary skill in the art can still derive other accompanying drawings from the accompanying drawings without creative efforts.

DETAILED DESCRIPTION

To make a person skilled in the art understand solutions of this application better, the following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The term "include" and any other variant thereof in the specification, claims, and the foregoing accompanying drawings of this application are intended to cover a non-exclusive inclusion.

Figure 1:
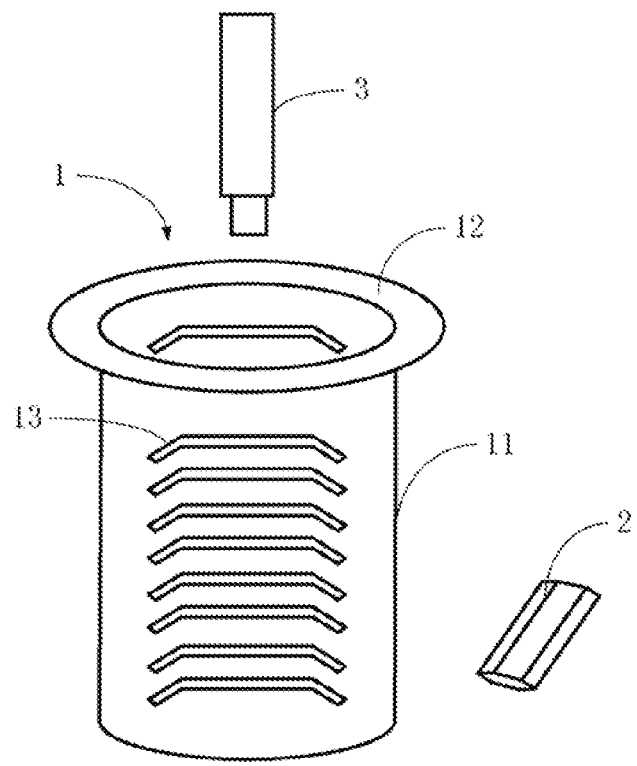
FIG. 1 is a schematic structural diagram of a device for testing impact resistance according to an embodiment of this application.

As shown in FIG. 1, an embodiment of this application provides a device for testing impact resistance of a shrink film, including a shrink film supporting member 1, a level plate 2, and an impact member 3.

The shrink film supporting member 1 is disposed on a horizontal platform for use. During specific application, the horizontal platform is specifically any horizontal bench, such as a desktop or a mechanical operation desk, disposed horizontally relative to the horizontal ground.

The shrink film supporting member 1 includes a main body 11, a supporting part 12, and a plurality of fixing parts 13.

The main body 11 is a hollow columnar body. During specific application, the main body 11 may be a hollow cylinder-shaped body, a hollow elliptical cylinder-shaped body, or any other hollow polygonal body with a regular shape. As shown in FIG. 1, in this embodiment, the main body 11 is a hollow cylinder-shaped body.

The supporting part 12 is formed by extending outward along an edge of a top end of the main body 11, and is configured to support a tested shrink film. In this embodiment, the supporting part 12 is formed by horizontally extending outward along the edge of the top end of the main body 11, and its outer edge is a circle with a geometric center of the top end of the main body 11 as a center. During specific application, alternatively, the supporting part 12 may be formed by extending outward by 30° to 180° (not including 180°) along the edge of the top end of the main body 11, and its outer edge may be an ellipse.

The plurality of fixing parts 13 is sequentially disposed in parallel at positions of different height on a sidewall of the main body 11, and the fixing parts 13 disposed at the positions of different heights represent different impact resistance levels. The fixing parts 13 are configured to fix the level plate 2.

During specific application, the fixing part may be a shelf or a latch, or may be any fixing member capable of horizontally fixing the level plate inside the main body. As shown in FIG. 1, in this embodiment, the fixing part 13 is a latch, and each fixing part 13 includes a pair of latches at positions of a same height on the sidewall of the main body 11.

During specific application, distances between adjacent fixing parts among the plurality of fixing parts may be equal or not equal. As shown in FIG. 1, in this embodiment, distances between adjacent fixing parts among the plurality of fixing parts are equal.

During specific application, the supporting part 12 and the fixing parts 13 may be integrally formed with the main body 11, or may be connected and fixed to the main body 11 in a manner such as adhering, clamping, or screwing.

The level plate 2 is detachably fixed inside the main body 11 by means of any one of the plurality of fixing parts 13. During specific application, the level plate 2 may be any columnar component suitable for being fixed inside the main body 11 by means of the fixing part 13, and is, for example, a cuboid or a polygonal body whose opposite faces are parallel along a length direction. As shown in FIG. 1, in this embodiment, the level plate is a hexagonal body.

The impact member 3 is configured to move downward from a position above a geometric center of the supporting part 12 at a preset speed to exert a frontal impact on the shrink film supported on the supporting part 12.

During specific application, the preset speed may be set according to actual requirements. For example, the preset speed is in a range of 10 meters per minute (m/min) to 50 m/min. In this embodiment, the preset speed is 30 m/min. A range of the preset speed provided in this embodiment is not limited to the foregoing range, a specific speed is not limited to the foregoing speed, and both the range of the preset speed and the specific speed can be set according to actual requirements.

During specific application, the impact member 3 may be rod-shaped or any other shape facilitating impacting the shrink film. As shown in FIG. 1, in this embodiment, an upper end of the impact member 3 is a columnar body 31 sized and shaped for convenient grasping by a human hand, and a lower end thereof is a columnar protrusion 32 extending along an end of the columnar body.

Figure 2:
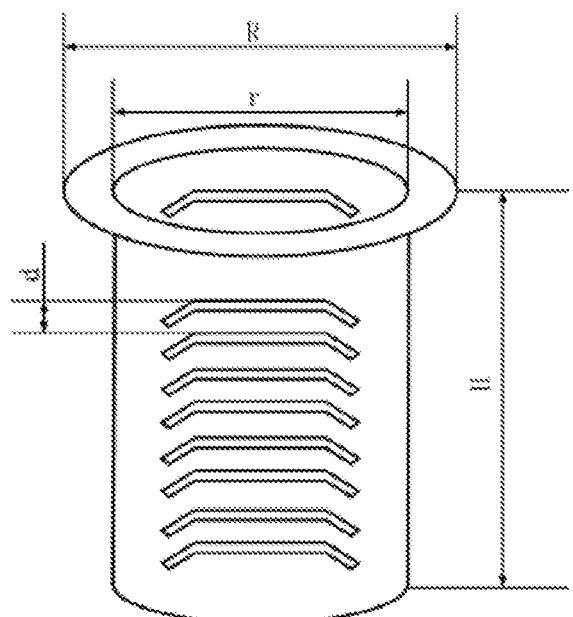
FIG. 2 is a schematic diagram of dimensions of a shrink film supporting member according to an embodiment of this application.

As shown in FIG. 2, in the figure, H is a height of the shrink film supporting member 1, r is an inner diameter of the main body 11, R is an outer edge diameter of the supporting part 12, and d is a distance between adjacent fixing parts.

During specific application, dimensions of the shrink film supporting member 1 may be set according to actual requirements. For example, the height H of the shrink film supporting member 1 may be in a range of 20 mm to 200 mm, when the main body 11 is a hollow cylinder-shaped body, the inner diameter r of the main body 11 may be in a range of 80 mm to 130 mm, the outer edge diameter R of the supporting part 12 may be in a range of 135 mm to 200 mm, and the distance d between adjacent fixing parts may be a range of 5 mm to 20 mm.

In this embodiment, the height of the shrink film supporting member 1 may be 120 mm, the inner diameter of the main body 11 may be 100 mm, the outer edge diameter of the supporting part 12 may be 160 mm, and the distance between adjacent fixing parts may be 10 mm.

Dimension ranges of the device for testing impact resistance provided in this embodiment are not limited to the foregoing ranges, specific dimensions are not limited to the foregoing dimensions, and both the dimension ranges and the specific dimensions can be set according to actual requirements.

During specific application, all of the shrink film supporting member 1, the level plate 2, and the impact member 3 are made from a metal material or a tempered glass material.

A principle of testing impact resistance of a shrink film by using the device for testing impact resistance provided in this embodiment is as follows:

If the shrink film is not broken when the impact member gets in contact with the level plate, an impact resistance level of the shrink film is greater than or equal to an impact resistance level corresponding to a fixing part configured to fix the level plate is determined; otherwise, the impact resistance level of the shrink film is less than the impact resistance level corresponding to the fixing part configured to fix the level plate is determined.

An embodiment of this application further provides a system for testing impact resistance of a shrink film, including:

the foregoing device for testing impact resistance; and a mechanical driving component, connected and fixed to the impact member, and configured to drive the impact member to move at a preset speed.

During specific application, the mechanical driving component may specifically include a mechanical arm and a servo motor.

The mechanical arm is configured to connect to and fix the impact member.

The servo motor is mechanically connected to the mechanical arm, and configured to drive the mechanical arm to move.

In an embodiment of this application, the system for testing impact resistance may further include a heating device, configured to heat the shrink film supported on the supporting part to make the shrink film shrink at a preset thermal shrinkage speed.

During specific application, the preset thermal shrinkage speed may be controlled by controlling a heating temperature, and the preset thermal shrinkage speed may be in a range of 100° C. per 5 seconds to 250° C. per 5 seconds. In this embodiment, the preset thermal shrinkage speed may be 150° C. per 5 seconds.

The preset thermal shrinkage speed provided in this embodiment is not limited to the foregoing range or the foregoing specific speed, and can be set according to actual requirements.

In an embodiment of this application, the system for testing impact resistance may further include a control part, configured to control a running speed of the servo motor. During specific application, the control part may be implemented by using a general purpose integrated circuit such as a central processing unit (CPU) or an application-specific integrated circuit (ASIC).

An embodiment of this application further provides a method for testing impact resistance of a shrink film, implemented based on the foregoing device for testing impact resistance of a shrink film or the foregoing system for testing impact resistance of a shrink film, where the method for testing impact resistance includes:

covering a supporting part of a shrink film supporting member with a tested shrink film, and fixing an edge of the shrink film to the bottom of the shrink film supporting member;

heating the shrink film to make the shrink film shrink at a preset thermal shrinkage speed;

controlling an impact member to move downward from a position above a geometric center of the supporting part at a preset speed to exert a frontal impact on the shrink film supported on the supporting part;

when the impact member gets in contact with a level plate, observing whether the shrink film is broken; and if the shrink film is not broken, an impact resistance level of the shrink film is greater than or equal to an impact resistance level corresponding to a fixing part configured to fix the level plate is determined; if the shrink film is broken, the impact resistance level of the shrink film is less than the impact resistance level corresponding to the fixing part configured to fix the level plate is determined.

The steps in the method in this embodiment of this application may be reordered, combined, or omitted according to actual requirements.

The descriptions above are merely preferred embodiments of this application, and are not intended to limit this application. Any modification, equivalent replacement, or improvement made within the spirit and principle of this application shall fall within the protection scope of this application.

What is claimed is:

1. A device for testing impact resistance of a shrink film, comprising:

a shrink film supporting member, disposed on a horizontal platform, wherein the shrink film supporting member comprises a main body, a supporting part formed by extending outward along an edge of a top end of the main body, and a plurality of fixing parts disposed on a sidewall of the main body, the supporting part is configured to support a tested shrink film, the plurality of fixing parts is sequentially disposed in parallel at positions of different heights on the sidewall of the main body, and the fixing parts disposed at the positions of different heights represent different impact resistance levels;

a level plate, detachably fixed inside the main body by means of any one of the plurality of fixing parts;

an impact member, configured to move downward from a position above a geometric center of the supporting part at a preset speed to exert a frontal impact on the shrink film supported on the supporting part; and a heating device configured to heat the shrink film supported on the supporting part to make the shrink film shrink at a preset thermal shrinkage speed, wherein the shrink film is not broken when the impact member gets in contact with the level plate, and an impact resistance level of the shrink film is greater than or equal to an impact resistance level corresponding to a fixing part configured to fix the level plate is determined; or the shrink film is broken when the impact member gets in contact with the level plate, and the impact resistance level of the shrink film is less than the impact resistance level corresponding to the fixing part configured to fix the level plate is determined, and wherein the shrink film has properties of puncture resistance, shrinkability, and shrinkage stress.

2. The device for testing impact resistance of a shrink film according to claim 1, wherein distances between adjacent fixing parts among the plurality of fixing parts are equal.

3. The device for testing impact resistance of a shrink film according to claim 1, wherein the fixing part is a latch disposed on an inner sidewall of the main body.

4. The device for testing impact resistance of a shrink film according to claim 1, wherein the fixing part is a shelf disposed on an inner sidewall of the main body.

5. The device for testing impact resistance of a shrink film according to claim 1, wherein the impact member is rod-shaped, an upper end thereof is a columnar body, and a lower end thereof is a columnar protrusion extending along an end of the columnar body.

6. The device for testing impact resistance of a shrink film according to claim 1, wherein all of the shrink film supporting member, the level plate, and the impact member are made from a metal material.

7. The device for testing impact resistance of a shrink film according to claim 1, wherein all of the shrink film supporting member, the level plate, and the impact member are made from a tempered glass material.

8. The device for testing impact resistance of a shrink film according to claim 1, wherein the main body is a hollow columnar body.

9. The device for testing impact resistance of a shrink film according to claim 1, wherein the supporting part is an annular body.

10. A system for testing impact resistance of a shrink film, comprising:
  a mechanical driving component; and
  a device for testing impact resistance, comprising:
  a shrink film supporting member, disposed on a horizontal platform, wherein the shrink film supporting member comprises a main body, a supporting part formed by extending outward along an edge of a top end of the main body, and a plurality of fixing parts disposed on a sidewall of the main body, the supporting part is configured to support a tested shrink film, the plurality of fixing parts is sequentially disposed in parallel at positions of different heights on the sidewall of the main body, and the fixing parts disposed at the positions of different heights represent different impact resistance levels;
  a level plate, detachably fixed inside the main body by means of any one of the plurality of fixing parts;
  an impact member, configured to move downward from a position above a geometric center of the supporting part at a preset speed to exert a frontal impact on the shrink film supported on the supporting part; and
  a heating device configured to heat the shrink film supported on the supporting part to make the shrink film shrink at a preset thermal shrinkage speed,
  wherein the shrink film is not broken when the impact member gets in contact with the level plate, and an impact resistance level of the shrink film is greater than or equal to an impact resistance level corresponding to a fixing part configured to fix the level plate is determined; or the shrink film is broken when the impact member gets in contact with the level plate, and the impact resistance level of the shrink film is less than the impact resistance level corresponding to the fixing part configured to fix the level plate is determined,
  wherein the mechanical driving component is connected and fixed to the impact member, and configured to drive the impact member to move at the preset speed, and
  wherein the shrink film has properties of puncture resistance, shrinkability, and shrinkage stress.

11. The system for testing impact resistance of a shrink film according to claim 10, wherein distances between adjacent fixing parts among the plurality of fixing parts are equal.

12. The system for testing impact resistance of a shrink film according to claim 10, wherein the fixing part is a latch or a shelf disposed on an inner sidewall of the main body.

13. The system for testing impact resistance of a shrink film according to claim 10, wherein the impact member is rod-shaped, an upper end thereof is a columnar body sized and shaped for convenient grasping by a human hand, and a lower end thereof is a columnar protrusion extending along an end of the columnar body.

14. The system for testing impact resistance of a shrink film according to claim 10, wherein all of the shrink film supporting member, the level plate, and the impact member are made from a metal material.

15. The system for testing impact resistance of a shrink film according to claim 10, wherein all of the shrink film supporting member, the level plate, and the impact member are made from a tempered glass material.

16. The system for testing impact resistance of a shrink film according to claim 10, wherein the main body is a hollow columnar body.

17. The system for testing impact resistance of a shrink film according to claim 10, wherein the supporting part is an annular body.

18. The system for testing impact resistance of a shrink film according to claim 10, wherein the mechanical driving component comprises:
  a mechanical arm, configured to connect to and fix the impact member; and
  a servo motor, mechanically connected to the mechanical arm, and configured to drive the mechanical arm to move.

19. A method for testing impact resistance of a shrink film, comprising:
  covering a supporting part of a shrink film supporting member with a tested shrink film, and fixing an edge of the shrink film to the bottom of the shrink film supporting member;
  heating the shrink film to make the shrink film shrink at a preset thermal shrinkage speed;
  controlling an impact member to move downward from a position above a geometric center of the supporting part at a preset speed to exert a frontal impact on the shrink film supported on the supporting part;
  when the impact member gets in contact with a level plate, observing whether the shrink film is broken; and
  if the shrink film is not broken, an impact resistance level of the shrink film is greater than or equal to an impact resistance level corresponding to a fixing part configured to fix the level plate is determined; or if the shrink film is broken, the impact resistance level of the shrink film is less than the impact resistance level corresponding to the fixing part configured to fix the level plate is determined,
  wherein the shrink film has properties of puncture resistance, shrinkability, and shrinkage stress.

* * * * *